US011679766B2

(12) United States Patent
Wang et al.

(10) Patent No.: US 11,679,766 B2
(45) Date of Patent: Jun. 20, 2023

(54) TECHNIQUES FOR VEHICLE LANE LEVEL LOCALIZATION USING A HIGH-DEFINITION MAP AND PERCEPTION SENSORS

(71) Applicants: Zijian Wang, Troy, MI (US); Peter Isho, Troy, MI (US); Mohammad Huq, Hamtramck, MI (US); Stephen W Horton, Rochester, MI (US)

(72) Inventors: Zijian Wang, Troy, MI (US); Peter Isho, Troy, MI (US); Mohammad Huq, Hamtramck, MI (US); Stephen W Horton, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 285 days.

(21) Appl. No.: 17/101,438

(22) Filed: Nov. 23, 2020

(65) Prior Publication Data
US 2022/0161793 A1   May 26, 2022

(51) Int. Cl.
*B60W 30/12* (2020.01)
*B60W 30/18* (2012.01)
*G01C 21/00* (2006.01)
*B60W 40/06* (2012.01)
*G06V 20/56* (2022.01)

(52) U.S. Cl.
CPC ...... *B60W 30/12* (2013.01); *B60W 30/18163* (2013.01); *B60W 40/06* (2013.01); *G01C 21/3848* (2020.08); *G06V 20/588* (2022.01); *B60W 2552/53* (2020.02); *B60W 2554/806* (2020.02)

(58) Field of Classification Search
CPC .......... B60W 30/12; B60W 30/18163; B60W 40/06; B60W 2552/53; G01C 21/3848; G06V 20/588
See application file for complete search history.

(56) References Cited

U.S. PATENT DOCUMENTS

| 2016/0314360 | A1* | 10/2016 | Kizumi | G06V 20/588 |
|---|---|---|---|---|
| 2018/0188041 | A1 | 7/2018 | Chen et al. | |
| 2018/0188059 | A1 | 7/2018 | Wheeler et al. | |
| 2019/0003838 | A1 | 1/2019 | Kudrynski et al. | |
| 2019/0122386 | A1 | 4/2019 | Wheeler et al. | |

(Continued)

OTHER PUBLICATIONS

Rose, Christopher, "Lane Level Localization with Camera and Inertial Measurement Unit using an Extended Kalman Filter", 120 pages. Dec. 13, 2010.

(Continued)

*Primary Examiner* — Kenneth J Malkowski
(74) *Attorney, Agent, or Firm* — Ralph E. Smith

(57) ABSTRACT

Lane level localization techniques for a vehicle utilize a plurality of perception sensor systems each configured to perceive a position of the vehicle relative to its environment, a map system configured to maintain map data that includes lane lines, and a controller configured to detect a position of the vehicle and a first set of lane lines using the plurality of perception sensors, detect a second set of lane lines using the position of the vehicle and the map data, obtain an aligned set of lane lines based on the first and second sets of lane lines, and use the aligned set of lane lines for an autonomous driving feature of the vehicle.

10 Claims, 3 Drawing Sheets

(56) References Cited

U.S. PATENT DOCUMENTS

2019/0271550 A1* 9/2019 Breed .................... G08G 1/205
2020/0005068 A1* 1/2020 Ozog ..................... G06V 10/44

OTHER PUBLICATIONS

Hosseinyalamdary, S., et al, "Lane Level Localization; Using Images and HD Maps to Mitigate the Lateral Error". The International Archives of the Photogrammetry, Remote Sensing and Spatial Information Sciences, vol. XLII-1/W1, 6 pages. 2017.

* cited by examiner

TECHNIQUES FOR VEHICLE LANE LEVEL LOCALIZATION USING A HIGH-DEFINITION MAP AND PERCEPTION SENSORS

FIELD

The present application generally relates to vehicle autonomous driving features and, more particularly, to techniques for vehicle lane level localization using a high-definition map and perception sensors.

BACKGROUND

Localization of a vehicle's position at a lane level is an important aspect of autonomous driving features, such as automated lane keeping and lane changing. The term "lane level localization" refers to determining the actual position of the vehicle relative to two or more lane lines of a road along which the vehicle is currently traveling. Conventional autonomous driving systems may suffer from potentially insufficient and/or noisy data (e.g., camera-only based systems), which could result in inaccurate vehicle lane level localization and in turn inaccurate automated lane keeping and lane changing, which is an essential function of autonomous driving. Thus, while such autonomous driving systems do work for their intended purpose, there remains a need for improvement in the relevant art.

SUMMARY

According to one example aspect of the invention, a lane level localization system for a vehicle is presented. In one exemplary implementation, the system comprises: a plurality of perception sensor systems each configured to perceive a position of the vehicle relative to its environment, a high-definition (HD) map system configured to maintain HD map data that includes lane lines, and a controller configured to: detect a position of the vehicle and a first set of lane lines using the plurality of perception sensors, detect a second set of lane lines using the position of the vehicle and the HD map data, obtain an aligned set of lane lines based on the first and second sets of lane lines, and use the aligned set of lane lines for an autonomous driving feature of the vehicle.

In some implementations, the plurality of perception sensors comprises at least a global navigation satellite system (GNSS) receiver and one or more cameras. In some implementations, the plurality of perception sensors further comprises a real-time kinematic (RTK) system and an inertial measurement unit (IMU), and wherein the controller detects the position of the vehicle using the GNSS receiver, the RTK system, and the IMU and detects the first set of lane lines using the one or more cameras.

In some implementations, the controller is further configured to estimate a Gaussian distribution of a first set of character points for an ego-lane lines of the first set of lane lines. In some implementations, the controller is further configured to filter the second set of lane lines based on the vehicle position and a heading of the vehicle to obtain a filtered second set of lane lines and to generate a second set of character points for the filtered second set of lane lines.

In some implementations, the controller is configured to obtain the aligned set of lane lines based on the first and second sets of lane lines by weighting and matching the first and second sets of character points. In some implementations, the controller is further configured to update the vehicle position and vehicle heading based on the aligned set of lane lines. In some implementations, the autonomous driving feature is automated lane keeping and lane changing.

According to another example aspect of the invention, a method for lane level localization of a vehicle is presented. In one exemplary implementation, the method comprises: detecting, by a controller of the vehicle, a position of the vehicle and a first set of lane lines using a plurality of perception sensors each configured to perceive a position of the vehicle relative to its environment, detecting, by the controller, a second set of lane lines using the position of the vehicle and high-definition map data from an HD map system configured to maintain HD map data that includes lane lines, obtaining, by the controller, an aligned set of lane lines based on the first and second sets of lane lines, and using, by the controller, the aligned set of lane lines for an autonomous driving feature of the vehicle.

In some implementations, the plurality of perception sensors comprises at least a GNSS receiver and one or more cameras. In some implementations, the plurality of perception sensors further comprises an RTK system and an IMU, and wherein detecting the position of the vehicle comprises using the GNSS receiver, the RTK system, and the IMU and detecting the first set of lane lines comprises using the one or more cameras.

In some implementations, the method further comprises estimating, by the controller, a Gaussian distribution of a first set of character points for an ego-lane lines of the first set of lane lines. In some implementations, the method further comprises filtering, by the controller, the second set of lane lines based on the vehicle position and a heading of the vehicle to obtain a filtered second set of lane lines, and generating, by the controller, a second set of character points for the filtered second set of lane lines.

In some implementations, obtaining the aligned set of lane lines based on the first and second sets of lane lines comprises weighting and matching the first and second sets of character points. In some implementations, the method further comprises updating, by the controller, the vehicle position and vehicle heading based on the aligned set of lane lines. In some implementations, the autonomous driving feature is automated lane keeping and lane changing.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, conventional autonomous driving systems may suffer from potentially insufficient and/or noisy data (e.g., camera-only based systems), which could result in inaccurate vehicle lane level localization and in turn inaccurate automated lane keeping and lane changing, which is an essential function of autonomous driving. Accordingly, improved vehicle lane level localization techniques are presented that fuse vehicle perception sensors with high-definition (HD) map data. HD map data differs from conventional/standard map data in that it includes much greater detail including lane lines, traffic signs, and the like. This fused approach improved localization accuracy by using a full suite of perception sensors (global navigation satellite system (GNSS) receiver, real-time kinematic (RTK) system, inertial measurement unit (IMU), camera(s), etc.) in conjunction with HD map data, which provides high quality information of the environment including lane lines and traffic signs, and the camera(s), which are also capable of detecting lane lines. Weighted matching and filtering are also utilized to solve any misalignment between lane lines detected by the suite of perception sensors and the lane lines from the HD map data.

Figure 1:
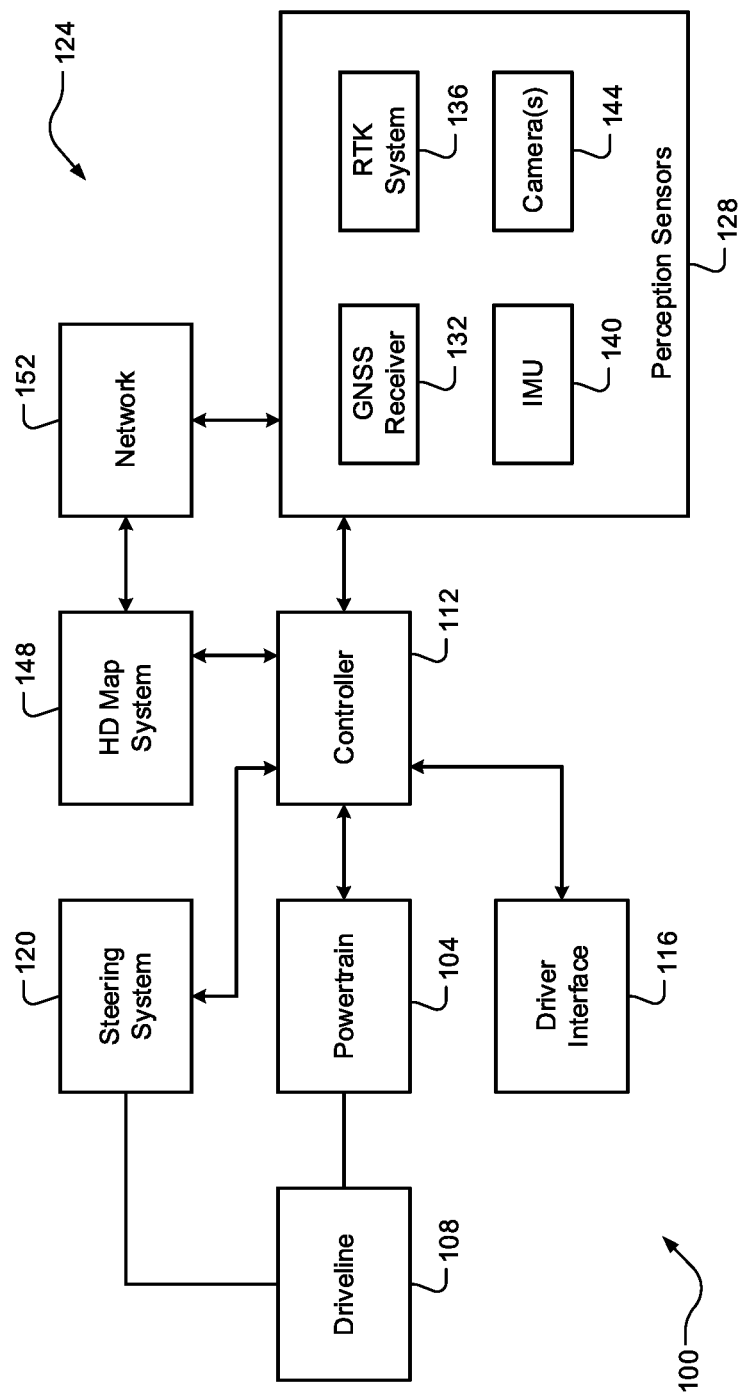
FIG. 1 is a functional block diagram of an example vehicle having an autonomous driving system according to the principles of the present disclosure.

Referring now to FIG. 1, a functional block diagram of an example vehicle 100 having an autonomous driving system 124 according to the principles of the present disclosure is illustrated. The vehicle 100 comprises a powertrain 104 (e.g., an engine, an electric motor, or combinations thereof) that generates drive torque that is transferred to a driveline 108 for vehicle propulsion. A controller 112 controls operation of the vehicle 100, including, but not limited to, controlling the powertrain 104 to generate a desired amount of drive torque (e.g., based on driver input via a driver interface 116, such as an accelerator pedal). The controller 112 is also configured to perform at least some autonomous driving features, including, but not limited to, automated lane keeping and lane changing (e.g., by controlling a steering system 120). It will be appreciated that the term "autonomous" as used herein refers to both driver take-over features (e.g., advanced driver assistance features, or ADAS) as well as semi-autonomous and fully-autonomous (e.g., level 4, or L4) modes.

For purposes of the present disclosure, the autonomous driving system 124 of the vehicle 100 generally comprises the controller 112, the steering system 120, a plurality of perception sensors or sensor systems 128 (also referred to herein as a "suite of perception sensors" or a "perception sensor suite") and an HD map system 148 in communication with a network 152 (the Internet, a global satellite system (GSS) network, etc.). The plurality of perception sensors 128 could include, for example, a GNSS receiver 132, which could also communicate via the network 152 or another suitable network, an RTK system 136, an IMU 140, and one or more cameras 144. In one exemplary implementation, the GNSS receiver 132 receives a signal indicative of a position of the vehicle 100, which is then precision enhanced based on information from the RTK system 136 (e.g., signal phase-based adjustments) and the IMU 140 (position, velocity, orientation, etc.).

The camera(s) 144 are used to capture images (e.g., in front of the vehicle 100), which are used to detect a first set of lane lines (e.g., two or more lanes proximate to the vehicle 100). This lane line detection could be performed by the camera(s) 144 themselves or by the controller 112. The controller 112 also uses the precise vehicle position and HD map data from the HD map system 148 to detect a second set of lane lines. The HD map system 148 routinely caches (e.g., stores in memory) and updates this HD map data. During a long period of driving, multiple update/cache cycles could be performed. In addition, the HD map system 148 may not always have a strong connection to the network 152. Thus, the HD map system 148 could implement a switching feature such that locally cached HD map data is used when the network 152 is unavailable for real-time downloading/updating.

Figure 2A:
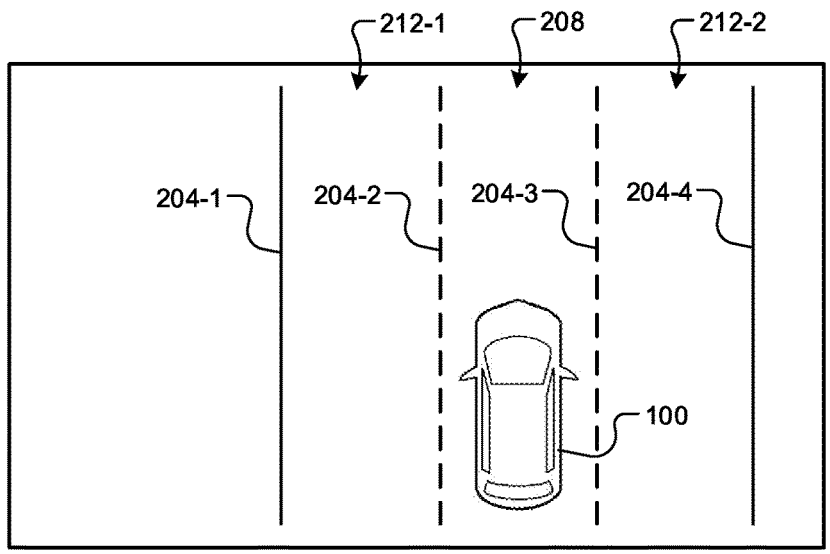
FIGS. 2A-2C are overhead diagrams illustrating the misalignment and between lane lines detected by perception sensors and lane lines from high-definition (HD) map data and the subsequent alignment according to the principles of the present disclosure.
Figure 2B:
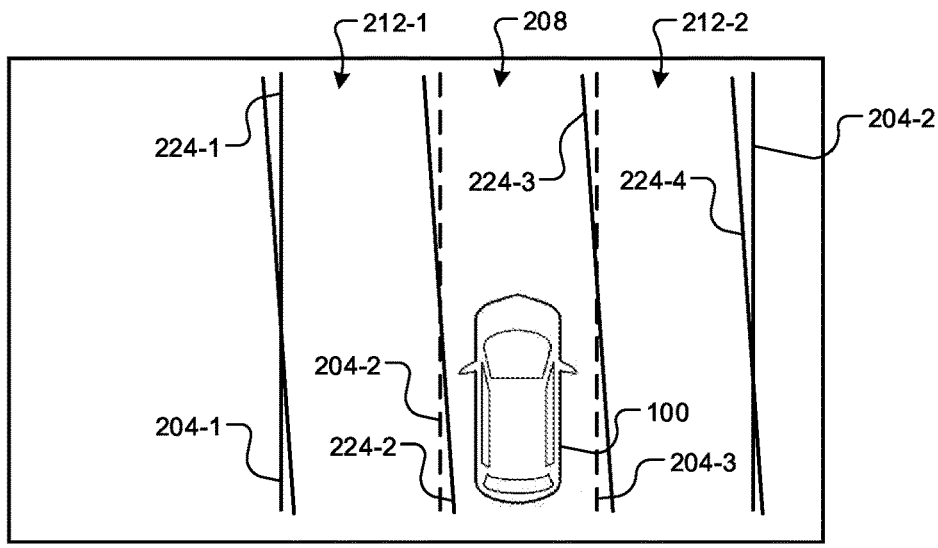
Figure 2C:
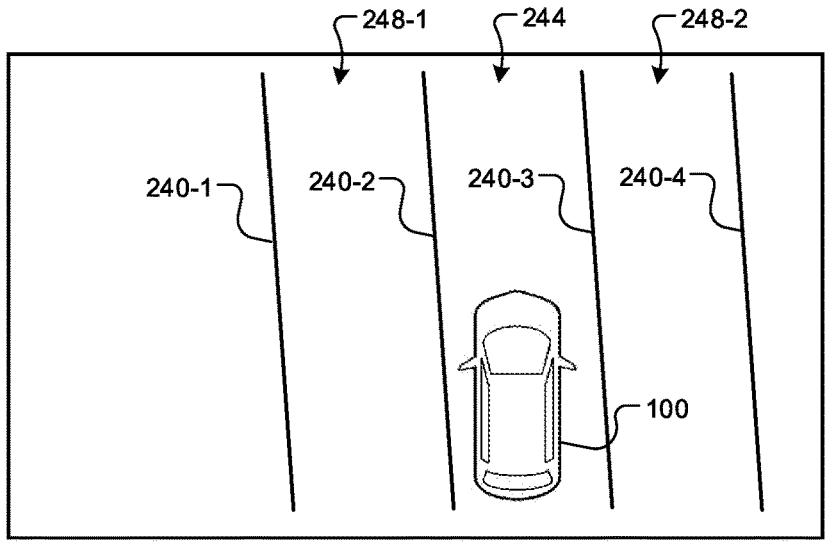

Referring now to FIGS. 2A-2C and with continued reference to FIG. 1, example overhead views of the vehicle 100 and the misalignment between the first and second sets of detected lane lines described above and subsequent correction or alignment according to the principles of the present disclosure are illustrated. The term "ego-lane" as used below refers to the current lane in which the vehicle 100 is traveling. FIG. 2A illustrates an example overhead view of the vehicle 100 with the first set of lane lines 204-1 . . . 204-4 (collectively, "first set of lane lines 204") detected using the camera(s) 144. The first set of lane lines 204 correspond to an ego-lane 208 and left and right side-lanes 212-1, 212-2, respectively.

In FIG. 2B, the second set of lane lines 224-1 . . . 224-4 (collectively, "second set of lane lines 224") detected using the vehicle position and the HD map data are overlaid atop the previous example overhead view of FIG. 2A. As can be seen, the first and second sets of lane lines 204, 224 cannot be directly matched with each other, even though these sets of lane liens 204, 224 are the same and thus should align with each other. In FIG. 2C, alignment has occurred and an aligned set of lane lines 240-1 . . . 240-4 (collectively, "aligned set of lane lines 240") are obtained, which define ego-lane 244 and left and right side-lanes 248-1 and 248-2, respectively. Vehicle position and heading updating (current and history) could also be performed, which is described in greater detail below.

Figure 3:
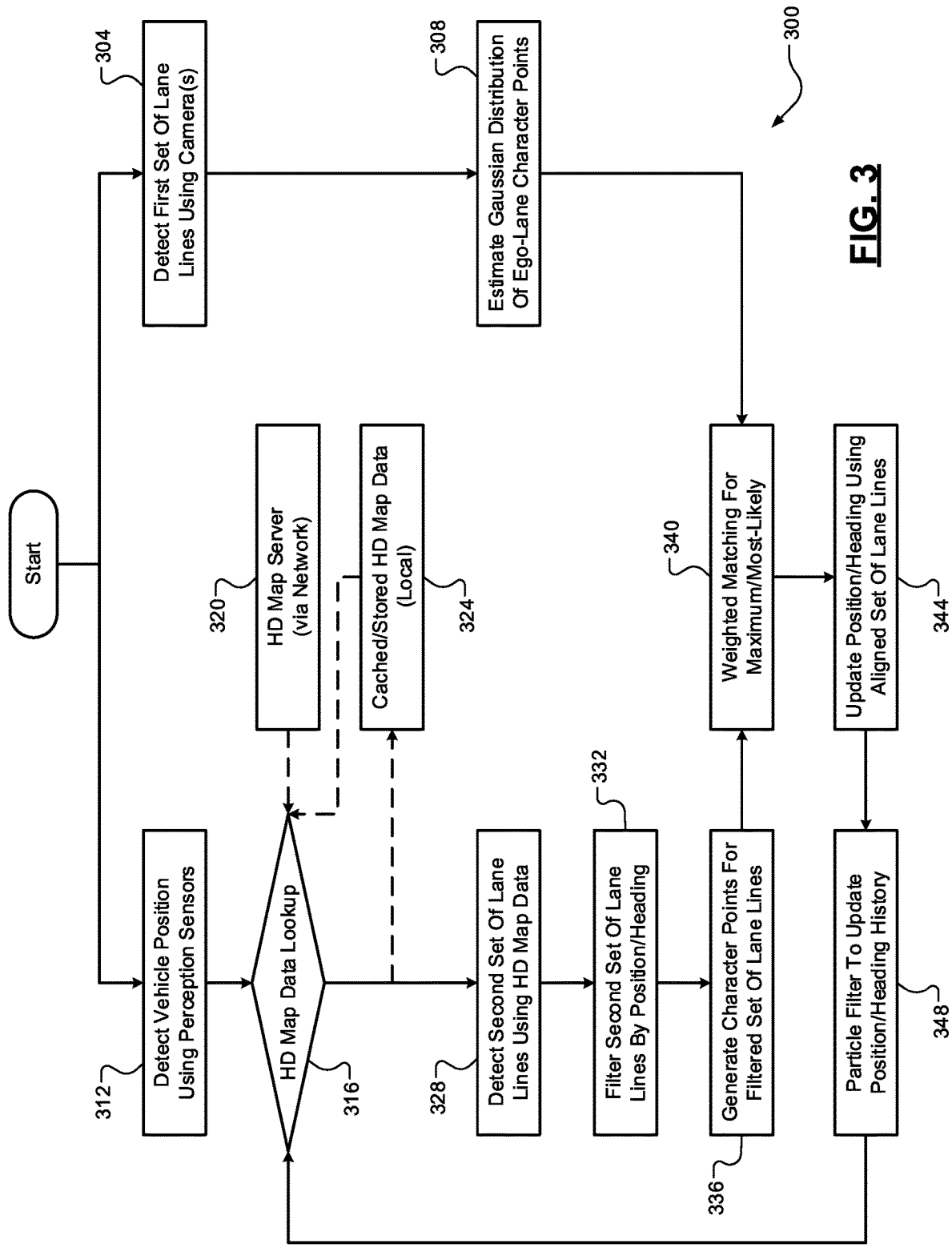
FIG. 3 is a flow diagram of an example method for vehicle lane level localization using perception sensors and HD map data according to the principles of the present disclosure.

Referring now to FIG. 3, a flow diagram of an example method 300 of vehicle lane level localization using HD map data and perception sensors according to the principles of the present disclosure is illustrated. While the vehicle 100 and its components are specifically referenced, it will be appreciated that this method 300 could be applicable to any suitable vehicle. Initially, the method 300 branches into two parallel paths. In a first (right-side) path at 304, the controller 112 detects the first set of lane lines using the camera(s) 144. At 308, the controller 112 estimates the Gaussian distribution of character points in the ego-lane lines. The character points are extracted from physical properties of the lane line. In 308, the Gaussian distribution of character points of ego-lane and neighboring or side-lane lines are estimated, including adding different weights to ego-lane lines and side-lane lines (see below). This information obtained at 308 is then utilized by the controller 112 at 340 where the first (right-side) path reconverges with the second (left-side path).

In the second (left-side) path at 312, the controller 112 detects the vehicle position using the plurality of perception sensors 128 (e.g., the GNNS receiver 132 received vehicle position enhanced by the RTK system 136 and the IMU 140 measurements). At 316, the controller 112 obtains HD map data relative to the vehicle position. This could include retrieving locally cached/stored HD map data at the HD may system 148 (see 324) or downloading/updating HD map data by the HD map system 148 via the network 152 (see 320). At 328, the controller 112 detects the second set of lane lines using the HD map data and the vehicle position.

At 332, the controller 112 filters the second set of lane lines based on the vehicle position and a heading of the vehicle 100 (e.g., known from the plurality of perception sensors 128). At 336, the controller 112 generates a set of character points of the filtered second set of lane lines. At 340, the controller 112 performs matching of the two sets of character points with weighting (e.g., ego-lane lines vs. side-lane lines) to determine a maximum possibility (i.e., a most-likely set of character points corresponding to a set of lane lines). These matched character points are indicative of a matched or aligned set of lane lines. In other words, this attempts to align the ego-lane lines.

At 344, the controller 112 updates the vehicle position and heading information based on the matched/aligned set of lane lines. More specifically, offset and heading differences are computed to correct the position and heading of the vehicle 100 (e.g., resulting from sensor drift). In some implementations, at 348 the controller 112 performs particle filtering to update history data of vehicle position and heading (e.g., to filter noise and for prediction of future data). The aligned set of lane lines could also be used for any suitable autonomous driving features, such as, but not limited to, automated lane keeping and lane changing. The method 300 then ends or continues to run (in both parallel paths), which could include the second (left-side) path returning from 344 or 348 to 316.

As previously discussed, it will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A lane level localization system for a vehicle, the system comprising:
    a plurality of perception sensor systems each configured to perceive a position of the vehicle relative to its environment and including one or more cameras, a global navigation satellite system (GNSS) receiver, a real-time kinematic (RTK) system, and an inertial measurement unit (IMU);
    a map system configured to maintain map data that includes lane lines; and
    a controller configured to:
        detect a position of the vehicle using the GNSS receiver, the RTK system, and the IMU;
        detect a first set of lane lines using the one or more cameras including estimating a Gaussian distribution of a first set of character points for ego-lane lines of the first set of lane lines;
        detect a second set of lane lines using the position of the vehicle and the map data;
        obtain an aligned set of lane lines based on the first and second sets of lane lines; and
    use the aligned set of lane lines for controlling an autonomous driving feature of the vehicle.

2. The system of claim 1, wherein the controller is further configured to filter the second set of lane lines based on the vehicle position and a heading of the vehicle to obtain a filtered second set of lane lines and to generate a second set of character points for the filtered second set of lane lines.

3. The system of claim 2, wherein the controller is configured to obtain the aligned set of lane lines based on the first and second sets of lane lines by weighting and matching the first and second sets of character points.

4. The system of claim 3, wherein the controller is further configured to update the vehicle position and vehicle heading based on the aligned set of lane lines.

5. The system of claim 1, wherein the autonomous driving feature is automated lane keeping and lane changing.

6. A method for lane level localization of a vehicle, the method comprising:
    detecting, by a controller of a vehicle, a first set of lane lines using one or more cameras of a plurality of perception sensor systems each configured to perceive a position of the vehicle relative to its environment, wherein detecting the first set of lane lines includes estimating, by the controller, a Gaussian distribution of a first set of character points for ego-lane lines of the first set of lane lines, and wherein the plurality of perception sensors further includes a global navigation satellite system (GNSS) receiver, a real-time kinematic (RTK) system, and an inertial measurement unit (IMU);
    detecting, by the controller, a position of the vehicle using the GNSS receiver, the RTK system, and the IMU;
    detecting, by the controller, a second set of lane lines using the position of the vehicle and map data from a map system configured to maintain map data that includes lane lines;
    obtaining, by the controller, an aligned set of lane lines based on the first and second sets of lane lines; and
    using, by the controller, the aligned set of lane lines for controlling an autonomous driving feature of the vehicle.

7. The method of claim 6, further comprising:
    filtering, by the controller, the second set of lane lines based on the vehicle position and a heading of the vehicle to obtain a filtered second set of lane lines; and
    generating, by the controller, a second set of character points for the filtered second set of lane lines.

8. The method of claim 7, wherein obtaining the aligned set of lane lines based on the first and second sets of lane lines comprises weighting and matching the first and second sets of character points.

9. The method of claim 8, further comprising updating, by the controller, the vehicle position and vehicle heading based on the aligned set of lane lines.

10. The method of claim 6, wherein the autonomous driving feature is automated lane keeping and lane changing.

* * * * *